Patented Mar. 10, 1942

2,276,090

UNITED STATES PATENT OFFICE 2,276,090

HYDROLYSIS OF PRODUCTS OBTAINED BY REACTING SATURATED HYDROCARBONS WITH SULPHUR DIOXIDE AND CHLORINE

Cortes F. Reed, Anoka, Minn., assignor to Charles L. Horn, Minneapolis, Minn.

No Drawing. Application February 17, 1939, Serial No. 257,018

4 Claims. (Cl. 260—513)

This invention relates to the preparation of organic compounds and compositions. More particularly it relates to the hydrolysis of the reaction products obtained by reacting a saturated hydrocarbon with gaseous sulphur dioxide and chlorine and hydrolyzing the reaction product with a concentrated aqueous alkali metal hydroxide solution and to treating solutions containing such hydrolyzed and neutralized products.

The solubilization of hydrocarbons, particularly saturated normally liquid or easily liquefiable aliphatic hydrocarbons or mixtures of such hydrocarbons by reacting them simultaneously with gaseous chlorine and sulphur dioxide and saponifying or hydrolyzing the resulting products is described in Reed U. S. Patent 2,046,090.

In carrying out the process described in the aforementioned patent a hydrocarbon-containing compound such as a petroleum oil, fatty acid, or animal or vegetable oil or fat is reacted with sulphur dioxide and chlorine. The product formed is then hydrolyzed or saponified by reaction with an alkali. The hydrolysis procedure may be carried out by the use of an alkaline solution as set forth in Patent 2,046,090 or by strong alkaline solutions, mixed alkaline solutions, or by using any of the mentioned solutions according to the procedures herein specified.

It has been found that the raw reaction products aforementioned may be hydrolyzed by the use of alkaline solutions ranging from weak alkaline solutions through all concentrations to saturated and supersaturated solutions, and that the hydrolysis may even be effected under suitable conditions by the use of stick caustic.

It has also been discovered that mixed alkaline salt solutions of diverse characteristics, as, for example, solutions containing mixtures of alkali metal hydroxides and carbonates effectively hydrolyzes or saponifies the raw reaction product.

It has also been found that if a small amount of the hydrolysis product obtained from previous hydrolysis, which may be termed a "heel," is added to a new batch of hydrolyzed material that the hydrolysis or saponification reaction goes to completion rapidly in both neutral or alkaline solutions, dilute or concentrated.

The "heel" may be added directly to the material to be hydrolyzed and/or neutralized with agitation, or it may be mixed with the hydrolyzing liquid and added to the material to be treated or the material to be treated may be added with agitation to the hydrolysis medium containing the "heel."

Regardless of the particular technique employed, it has been found that in all cases the hydrolysis or saponification and/or neutralization speeds up very materially if a "heel" is used. Alkali metal base solutions, particularly alkali metal hydroxides, both dilute and concentrated, are effective as the hydrolysis mediums. When the products are desired in the presence of their salts enough alkali metal base should be added to neutralize all of the hydrolyzed acid groups.

It has further been found that if a concentrated aqueous alkaline solution is used for the hydrolysis that the hydrolysis will go to completion rapidly without the use of a "heel," particularly if agitation is resorted to. By concentrated aqueous alkaline solution is meant one which contains at least enough of the base to be equivalent to a 10% alkali metal hydroxide solution.

In a preferred embodiment of the invention, the objects are accomplished by the use of a concentrated aqueous solution of an alkali metal hydroxide solution for hydrolyzing and neutralizing the reaction products obtained by reacting a hydrocarbon or equivalent material with gaseous chlorine and gaseous sulphur dioxide. While solutions containing at least 10% of the alkali metal hydroxide are very practical and allow the reaction to proceed fairly rapidly, more concentrated solutions such as those of at least 20% strength give still better results, and those having at least 30% strength are preferred. A fifty or sixty per cent solution is an effective hydrolyzing agent and portions of solid sodium hydroxide or other caustic, particularly finely divided caustic may be used as an addition during hydrolysis. It is advantageous to hydrolyze with a strong caustic solution because the products are usually marketed as solid materials and most of the water must be driven off or otherwise removed.

Rapid agitation, dispersion or solution of the hydrolyzing medium in the raw reaction product facilitates hydrolysis and the use of dispersing agents or mechanisms or compositions capable of forming emulsions or solutions is contemplated. Thus mechanical agitation or stirring increases the rate of hydrolysis by producing a fine dispersion of the oil in the hydrolyzing agent or vice versa. The use of a "heel" of previously hydrolyzed product or other solubilizing or emulsifying agent also increases the rate of hydrolysis (saponification), by bringing the hydrolyzing (saponifying) medium into intimate contact with the raw oil being treated. This is true even when concentrated caustic base solutions are used.

Thus, the use of a "heel" with a concentrated alkali metal hydroxide solution represents an important feature of the invention.

In place of the "heel" which is an excellent emulsifying agent may be substituted other emulsifying agents, e. g. Turkey red oil, alkylated aryl sulphonic acids, sulphated higher aliphatic alcohols, condensation products of long chain aliphatic carboxylic acids with taurine or isethionic acids, etc.

The invention will be further illustrated, but is not intended to be limited by the following examples in which the parts stated are parts by weight.

Example I

Ten parts of paraffin wax having a melting point of about 120° F. was placed in a tall cylindrical acid resistant vessel which was provided with an agitator. The vessel was heated upon a water bath until the wax melted. A mixture of gaseous sulphur dioxide and gaseous chlorine at a ratio of one to one was passed into the bottom of the tube for a period of about 20 hours. The exit gases were tested from time to time and were found to consist primarily of HCl. A portion of the resulting product which was a liquid was hydrolyzed and neutralized in aqueous NaOH 25% strength and gave a product having good detergent and surface-active properties.

Example II

A portion of the liquid product obtained in accordance with Example I was mixed with a very small amount of the hydrolyzed and neutralized product. The resulting oily liquid was run into a vessel containing hot saturated sodium hydroxide solution (50% to 60% strength) together with 25% aqueous caustic soda. The reaction was exothermic and the heating had to be discontinued to keep the solution from boiling over.

The process may be made continuous by drawing off the hydrolyzed and neutralized product.

Example III

To 100 parts of aqueous caustic soda 50% strength were slowly added with stirring 100 parts of the liquid product obtained according to Example I. The caustic soda solution was at 95° C. at the start and upon addition of the liquid a violent reaction took place. A solid product separated from the caustic soda solution which contained a considerable quantity of occluded base. Most of this may be removed by kneading or working.

Example IV

To one hundred parts of the reaction product prepared by reacting paraffin wax with chlorine in the manner set forth in Example I, were added with stirring 0.1 part of a "heel" of a previous hydrolyzed and neutralized product from paraffin wax and strong caustic soda. The mixture was then added to a 10% caustic soda solution with stirring. The resulting neutralized salts had good detergent and surface active properties.

Example V

Paraffin wax was reacted with a gaseous mixture of sulphur dioxide and chlorine at a temperature of about 50 to 90° C. The mixture was introduced into the molten wax over a period of 13 hours. The oily product formed was diluted with a small amount of water. To the resultant material was added with strong agitation a concentrated caustic soda solution in small quantities. The hydrolysis reaction proceeded vigorously with the evolution of heat and with foaming. Small portions of water were added from time to time to suppress foaming. The product formed had good detergent and softening properties.

Example VI

Paraffin wax was reacted with sulphur dioxide and chlorine in a similar manner to that set forth in Example V over a period of 30 hours. Five hundred parts of the resulting oil were added to 1500 parts of water containing 325 parts of soda ash, while maintaining a temperature of 40 to 90° C. and agitating the mixture. When the solution became clear it was neutralized with sulphuric acid and made neutral to litmus. The neutral solution was evaporated down in a flat dish on a hot plate until it reached a doughy state. The dough-like material was dried in (1) an oven and (2) a vacuum drier. The final product was yellow in color, soft, waxy and picked up moisture from the air.

Similar results may be obtained by substituting ammonium carbonate for the sodium carbonate.

Example VII

Paraffin wax was reacted with a gaseous mixture of sulphur dioxide and chlorine after the manner of Example V. Four hundred parts of the resulting oil were added to 400 parts of water containing 150 parts of sodium carbonate with stirring. The solution was boiled until it became clear and was thereupon neutralized with hydrochloric acid and boiled for a short time.

Fifty parts of the resulting oil were hydrolyzed in a similar manner with 100 parts of water containing 15 parts of sodium carbonate and 5 parts of sodium hydroxide. The solution was boiled for one-half hour, and neutralized with hydrochloric acid.

In place of the paraffin wax of Example I, one may substitute other types of paraffin wax including scale wax, hard and soft paraffin wax, lubricating oil, kerosene, higher saturated aliphatic hydrocarbons or any of the materials specifically mentioned in my prior Patent No. 2,046,090. These materials include animal and vegetable fats and oils and waxes, mineral hydrocarbons, glycerides, lard, olive oil, higher fatty acids.

The resulting products may be saponified or hydrolyzed and neutralized after the manner set forth in Examples I to III.

In place of the specific hydrolyzing solutions described in the previous examples, other concentrations may be substituted.

Likewise, the invention is not limited to the use of sodium hydroxide, but on the contrary, almost any inorganic base may be used. As examples of suitable inorganic bases, mention is made of lithium, potassium, calcium, barium, and ammonium hydroxide, sodium carbonate, potassium carbonate, etc. An aqueous solution of ammonium carbonate may be used to yield the ammonium salt. Mixtures of the above-mentioned compounds may also be used.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g. ethylene glycol diethyl ether, ethylene glycol dimethyl ether, etc.

The products produced by carrying out the reaction of Reed Patent 2,046,090 with hydrocarbons before hydrolysis are rather complex and apparently consist of primary and secondary hydrocarbon mono- and polysulphonyl chlorides predominating in the latter, chlorohydrocarbon mono- and polysulphonyl chlorides and chlorohydrocarbons.

The final product can be worked up in a number of ways. It can be left as a solution containing insoluble oil or a solution with the insoluble oil removed. The product can be spray- or drum-dried and applied as such, or standardized with some innocuous diluent. If a particularly pure product is desired, the drum dried product can be extracted with hot alcohol and the alcoholic extract evaporated to give a pure 100% product free from inorganic salts. Further, unreacted oil can be removed by diluting the hydrolyzed solution and separating. The oil can be extracted by means of a water immiscible solvent or it can be removed by steam distillation.

The resulting products may be used in each of the processes and compositions described in my copending application, Serial No. 216,332, filed June 28, 1938, of which this application is a continuation-in-part.

By hydrocarbon-containing compounds in the specification and claims, I mean not only pure hydrocarbons and mixtures thereof, but also hydrocarbon derivatives such as fatty acids, animal and vegetable fats, oils and waxes, and mixtures thereof.

As many apparently widely different embodiments of this invention may be made without departing from the spirit and scope thereof, it is to be understood that I do not limit myself to the specific embodiments herein except as defined by the appended claims.

I claim:

1. The method of forming surface active substitution products from hydrocarbons which comprises reacting a nongaseous saturated aliphatic hydrocarbon in the liquid state simultaneously with chlorine and sulphur dioxide, and hydrolyzing and neutralizing the resulting products with at least an aqueous alkali metal hydroxide solution of at least 20% strength.

2. The method of forming substitution products which comprises reacting a non-gaseous saturated aliphatic hydrocarbon with sulphur dioxide and chlorine to form a product containing sulphur, oxygen and chlorine and hydrolyzing the resulting product with a solution of an alkali metal hydroxide of at least 20% strength in the presence of an emulsifying agent.

3. A method as set forth in claim 2 wherein the emulsifying agent is a heel from a previous neutralization.

4. A process as set forth in claim 1 wherein said hydrocarbon is a paraffin wax and said alkali metal is sodium.

CORTES F. REED.